United States Patent Office 3,376,512
Patented Apr. 2, 1968

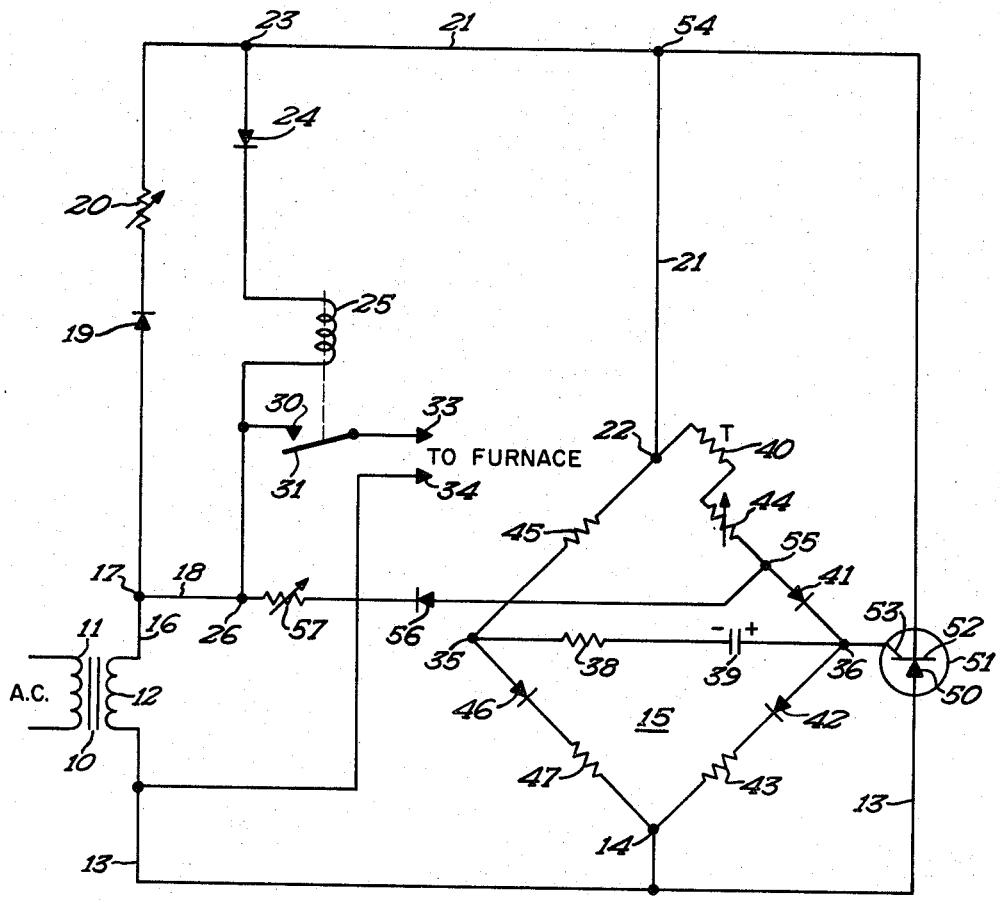

3,376,512
SEMICONDUCTOR APPARATUS
John E. Janssen, St. Louis Park, and Donald E. Benz, Minnetonka, Minn., assignors to Honeywell Inc., Minneapolis, Minn., a corporation of Delaware
Filed Mar. 11, 1965, Ser. No. 438,890
11 Claims. (Cl. 328—3)

This invention relates to new and improved condition responsive semiconductor control apparatus and more particularly relates in one embodiment to an electronic thermostat or temperature control system. In this invention an AC bridge circuit is provided with diodes which separate the half cycles of the power supply, the first half cyles being utilized to sense the bridge unbalance, i.e. the condition to be controlled, and the second half cycle of the AC wave is used to rebalance the bridge by allowing some load current to flow through the sensing element.

It is an object of this invention, therefore, to provide an improved electronic two-wire thermostat condition control system.

It is a more specific object to provide an electronic thermostat having a bridge type sensing circuit and in which diodes are used to separate the half cycles of the AC supply, the separated half cycles providing different functions.

It is another specific object of the invention to provide an electronic two position thermostat utilizing an SCR switching element which allows some load current to flow directly through the temperature sensing resistor to tend to rebalance the sensing bridge.

These and other objects of our invention will be more clearly understood upon a consideration of the claims, specification and drawing of which:

The single figure is a schematic representation of one embodiment of our invention.

Referring now to the figure, there is disclosed a step down power transformer 10 having a primary winding 11 which is adapted to be energized from a suitable source of alternating current potential. The transformer also includes a secondary winding 12, the lower terminal of which is connected by a conductor 13 to a first junction 14 of a resistive bridge network 15. The upper terminal of the secondary winding 12 is connected by a conductor 16, a junction 17, a diode 19, a resistor 20, and a conductor 21 to a second junction 22 on the bridge network 15. A relay load circuit is connected in parallel with the resistor 20, and this circuit may be traced from a junction 23 on the conductor 21 through a rectifying diode 24, a relay winding 25, a junction 26 and a conductor 18 to the junction 17. Relay 25 also includes a stationary contact 30 and a movable contact 31, the stationary contact 30 being directly connected by a conductor 18 to the upper terminal of winding 12. The movable contact 31 is directly connected to a first of a pair of output terminals 33 and 34, the other terminal 34 terminating at the lower terminal of winding 12.

As has been described, the bridge circuit 15 comprises a first pair of diagonally opposed junctions 14 and 22 and a second pair of diagonally opposed junctions 35 and 36. Connected between junctions 35 and 36 is a resistor 38 and a capacitor 39. Serially connected between junction 22 and junction 36 is a condition responsive sensing element 40, here shown as a PTC temperature responsive resistor, having a long thermal time constant, a setpoint potentiometer 44, and a rectifying diode 41. By a long thermal time constant we mean a period in the order of several minutes. If the system is to be used for cooling an NTC sensing element may be used. In one successful embodiment of this invention the temperature sensitive element 40 was wound around a ½" diameter aluminum rod to provide the proper thermal time constant or response for the element. Serially connected between junction 36 and junction 14 is a rectifying diode 42 and a resistor 43. Serially connected between junction 22 and junction 35 is a resistor 45. The fourth leg of the bridge between junction 35 and junction 14 is a diode 46 and a resistor 47.

The conductor 13 terminates at the anode 50 of an SCR 51. This SCR also includes a cathode 52 and a gate electrode 53. The gate electrode 53 is directly connected to the junction 36 of the bridge circuit and the cathode electrode 52 is directly connected to a junction 54 on the conductor 21. From a junction 55 located in the bridge leg between setpoint potentiometer 44 and diode 41, a circuit may be traced through a rectifying diode 56 and a variable resistor 57 to the junction 26.

Considering now the operation of the above described circuit, it will be noted that the rectifying diodes in the bridge circuit 15 are effective to separate the half cycles of the AC supply potential so that one half of the wave is utilized to sense bridge unbalance and the other half wave is utilized to energize the load and to aid the rebalance of the bridge by directly heating the temperature sensing element 40. Considering the operation in greater detail, let us first assume that the upper terminal of the winding 12 is instantaneously positive so that a current may flow from the winding 12 through the diode 19, the current limiting resistance 20 and the conductor 21 to the junction 22. Here the current path divides with a first current path flow through resistor 45, diode 46, and resistor 47, to junction 14 while the second branch of the current path allows the current to flow through temperature sensing resistor 40, set point resistance 44, diodes 41 and 42 and resistor 43 to the junction 14. The current path from junction 14 is completed back to winding 12 by the conductor 13.

Under conditions such that the bridge is balanced, the potential at junctions 35 and 36 will be the same and no current will flow to charge the capacitor 39 across these junctions. As the condition being sensed changes so that the value of the condition responsive resistor 40 decreases, the bridge becomes unbalanced and the capacitor 39 is charged to a potential depending upon the relative degree of unbalance. It will be noted that rectifying diode 24 prevents any current from flowing through the relay winding 25 during this half cycle. It will be further noted that the SCR 51 is reverse biased during this half cycle and cannot conduct.

During the second half cycle of the supply potential, that is, when the lower terminal of winding 12 is positive, it will be noted that the diodes 41, 42 and 46 prevent any current flow through the bridge from the source 12, and that unless the SCR 51 is rendered conductive, no current flows in the circuit during this second half cycle. Let us assume, however, that in the previous half cycle the bridge was unbalanced in a direction such that the junction 36 was positive relative to the junction 35 to charge the capacitor. Under these conditions it can be seen that a gate current now flows from the junction 36 through the SCR from gate electrode 53 to cathode 52, through the resistor 45 to the junction 35. This "turn on" current renders the SCR conductive and a current path may be traced from the lower terminal of winding 12 through the conductor 13, from anode to cathode of SCR 51, through diode 24 and relay winding 25, and back to conductor 16 at the upper terminal of the winding 12. The current flowing through the relay winding energizes the relay and closes contacts 30 and 31. If desired, coil 25 may be the solenoid of the controller thereby eliminating the need for the extra contacts 30 and 31. Alternately element 25 may be the load itself.

Since a finite amount of potential is needed at the gate electrode to turn on the SCR 51 it can be seen that under normal conditions the temperature being sensed gradually changes, the bridge becomes progressively more unbalanced and the charge on the capacitor increases over a period of time. When the bridge is sufficiently unbalanced the turn on signal from the capacitor is then effective to render the SCR conductive and energize the relay until the balance of the bridge is partially restored.

The current flowing through the SCR also has a small portion which flows directly through the condition sensing resistor 40. This current path, which is in parallel with the load relay, may be traced from junction 54, conductor 21, junction 22, sensing resistor 40, junction 55, diode 56 and resistor 57 to junction 26. The resistor 40 is heated by the current flowing therethrough. This heating of the sensing element changes its resistance in a direction to restore the balance of the bridge circuit and thus provide a degree of anticipation. It should also be noted that the relay when energized, provides a potential at output terminals 33 and 34 to operate the furnace to add heat to the area being controlled. While the specific embodiment shown was heating control it is obvious the circuit is equally applicable to cooling control.

In one practical embodiment of the invention the following components were used:

| | |
|---|---|
| Diodes 19, 24, 41, 42, 46, 56 | 1N2070. |
| SCR 51 | 2N2345. |
| Capacitor 39 | 1 mfd. 200 v. DC w. |
| Resistors 38, 43, 45, 47 | 1000 ohms. |
| Potentiometer 44 | 100 ohms. |
| Potentiometer 20, 57 | 1000 ohms. |
| Transformer 10 | Primary 117 v., 60 cy.; Sec. 25.2 v. |

While we have disclosed a specific embodiment of our invention for the purpose of illustration, we wish it to be understood that we intend to be limited solely by the scope of the appended claims.

We claim:
1. Condition control apparatus comprising:
power terminals energized from a suitable source of alternating current potential;
condition sensing bridge means having first and second input terminals and four legs, three of said legs comprising rectifying means and impedance means serially connected, the fourth leg comprising impedance means, the impedance means in one of said legs being responsive to the condition being sensed, said rectifying means being polarized so that unidirectional current may flow through said bridge from said first to said second terminal;
connection means including further impedance means connecting said alternating current power terminals to said first and second input terminals to energize said bridge means whereby pulsating unidirectional current flows in said bridge means;
controlled rectifier means having a control circuit and an output circuit;
output terminals on said bridge means connected in controlling relation to said control circuit;
a series circuit loop load circuit energized from said power terminals including a portion of said connection means comprising load means, and said controlled rectifying means output circuit;
and further unidirectional current conducting means connecting said condition responsive impedance means in a parallel relation with said load means.
2. Apparatus according to claim 1 in which said further impedance means comprises a first portion which includes a relay winding, load means and a current rectifier serially connected to permit unidirectional current flow only, and a second section in parallel with said first section comprising current limiting resistance means, said current rectifier being polarized opposite to said bridge rectifying means so that current flowing through said bridge means flows through said resistive means and current flowing through said controlled rectifier means flows through said relay winding.
3. Apparatus according to claim 1 in which said condition control apparatus is a temperature control apparatus.
4. Apparatus according to claim 1 in which said condition responsive impedance means has a long thermal time constant.
5. Electronic thermostat apparatus for use with a temperature conditioning installation having an electrically energizable controller for operating the temperature conditioning apparatus, and a temperature responsive impedance element for sensing the temperature to be controlled, the apparatus being characterized as a bridge circuit having input terminals "a" and "b" and output terminals "c" and "d," the apparatus comprising:
a source of alternating potential having first and second terminals;
first impedance means connecting said source first terminal to terminal "a";
serially connected load means and rectifying means connected in parallel with said first impedance means;
conductive means connecting said source second terminal to terminal "b" so that said bridge circuit is energized from said source;
temperature responsive impedance means having one end connected to terminal "a" and the other end connected through a first asymmetric current conducting means to terminal "c";
second impedance means and second asymmetric current conducting means serially connected between terminal "c" and terminal "b";
third impedance means and third asymmetric current conducting means serially connected between terminal "d" and terminal "b";
fourth impedance means serially connected between terminal "a" and terminal "d," said first, second and third asymmetric current conducting means being polarized to allow current flow only from terminal "a" toward terminal "b," so that said bridge is energized by half wave pulses;
energy storage means interconnecting terminals "c" and "d" and being charged by said half wave pulses by an amount which is a function of bridge impedance unbalance;
controlled rectifier means having a plurality of electrodes including anode, cathode and control electrodes, said anode being connected to terminal "b," said control electrode being connected to terminal "c," and said cathode being connected to terminal "a";
and further connection means connecting a junction between said temperature responsive impedance means and said first asymmetric means to said first source terminal whereby when energy stored in said capacitor means provides a gating signal for said controlled rectifier means and the resulting anode-cathode current energizes said load means, current also flows through said temperature responsive impedance means simultaneously causing heating of said temperature responsive impedance means for system anticipation.
6. Apparatus according to claim 5 in which said impedance means are resistive.
7. Apparatus according to claim 5 in which said load means comprises a relay.
8. Apparatus according to claim 5 in which said energy storage means comprises a capacitor.
9. Apparatus according to claim 5 in which said temperature responsive impedance means has a long thermal time constant.
10. In an electronic temperature control system having an impedance bridge sensing circuit for controlling the conduction of a controlled rectifier which in turn energizes the temperature conditioning equipment, the impedance bridge sensing circuit being arranged to separate the half cycles of the alternating current potential source such that the first half cycles are used for condition sensing and the last half cycles are used for anticipation by allowing a portion of load current to flow through the sensing element, the combination comprising:

a source of alternating current potential having a pair of power terminals;

bridge means comprising a plurality of leg portions, a first pair of input terminals, and a second pair of output terminals; said legs including impedance means and rectifying means in which the rectifying means are polarized to allow unidirectional current to flow in said bridge means from one output terminal to the other;

temperature responsive impedance means in one of said bridge leg portions;

controlled rectifier means having a control circuit and an output circuit;

said control circuit being connected to be controlled in response to the output signal of the bridge means;

further impedance means connecting a first of said power terminals to a first of said input terminals;

further means connecting the other of said power terminals to the second of said input terminals;

load means;

current rectifying means;

means connecting said load means and said current rectifying means in series, said connecting means being in parallel with said further impedance means;

means connecting the output circuit of said controlled rectifier means from said other power terminal to said connecting means and one terminal of said temperature responsive impedance means so that a load current series loop exists through said controlled rectifier means output circuit, said current rectifying means and said load means during said last half cycles;

and a further current path connecting the other terminal of said temperature responsive impedance means to said first power terminal so that upon energization of said load means, current simultaneously flows through said temperature responsive impedance means to cause heating thereof for system anticipation.

11. Condition control apparatus comprising:

power terminals energized from a suitable source of alternating current potential;

condition sensing bridge means having first and second input terminals and a plurality of legs, said legs comprising impedance means and rectifying means serially connected, the impedance means in one of said legs being condition responsive and changing as a function of the condition being sensed, said rectifying means being polarized so that unidirectional half wave current may flow through said bridge from said first to said second terminal;

connecting means including further impedance means connecting said alternating current power terminals to said first and second bridge means input terminals to energize said bridge means whereby a half wave unidirectional current flows in said bridge means for sensing bridge unbalance, said connection means also including load means and further rectifying means serially connected to allow unidirectional current flow only in said load means, said load means and further rectifying means being connected in parallel with said further impedance means, and said further rectifying means being oppositely poled with respect to said bridge means so that no current can flow in said load means during the half cycles current is flowing through said bridge means;

energy storage means connected to output terminals on said bridge means and being charged to an amount depending upon the magnitude of bridge unbalance;

solid state current control means having a control circuit and an output circuit;

said output terminals on said bridge means and said energy storage means connected in controlling relation to said control circuit;

a series load circuit energized from said power terminals and completed by said solid state current control means output circuit including at least a portion of said connection means, said load means, and the adjacent terminal of said condition responsive impedance means;

and a further current path connecting the other terminal of said condition responsive impedance means to the remote terminal of said load means so that upon turn on of said solid state current control means and the resulting energization of said load means, current simultaneously flows through said condition responsive means to provide anticipation.

No references cited.

ARTHUR GAUSS, *Primary Examiner.*

B. P. DAVIS, *Assistant Examiner.*